United States Patent [19]

Metzler et al.

[11] Patent Number: 4,819,769

[45] Date of Patent: Apr. 11, 1989

[54] BRAKE DISC DEVICE

[75] Inventors: Horst Metzler; Guenther Schwarz, both of Tuttlingen, Fed. Rep. of Germany

[73] Assignee: Schwaebische Huettenwerke Gesellschaft mit beschraenkter Haftung, Aalen-Wasseralfingen, Fed. Rep. of Germany

[21] Appl. No.: 39,224

[22] Filed: Apr. 17, 1987

[30] Foreign Application Priority Data

Apr. 17, 1986 [DE] Fed. Rep. of Germany ....... 3612896

[51] Int. Cl.⁴ ...................... F16D 65/10; B22D 19/00
[52] U.S. Cl. ........................... 188/218 XL; 164/98
[58] Field of Search ............ 188/218 XL; 192/113 A, 192/70.12; 164/98

[56] References Cited

U.S. PATENT DOCUMENTS

| 2,243,334 | 5/1941 | Eksergian | 188/218 XL |
|---|---|---|---|
| 2,284,357 | 5/1942 | Ash | |
| 2,350,970 | 6/1944 | Tack | 188/218 XL |
| 2,412,432 | 12/1946 | Tack | 188/218 XL |
| 2,423,056 | 6/1947 | Tarbox | 188/218 XL |
| 2,464,754 | 3/1949 | Tack | 188/218 XL |
| 3,905,419 | 9/1975 | Tenner | 164/363 X |
| 4,083,435 | 4/1978 | Gallus et al. | 188/218 XL |
| 4,508,159 | 4/1985 | Woltmann et al. | 164/306 |
| 4,595,044 | 6/1986 | Caugherty et al. | 164/312 X |
| 4,638,891 | 1/1987 | Wirth | 188/218 XL |

FOREIGN PATENT DOCUMENTS

| 0177672 | 4/1986 | European Pat. Off. | |
|---|---|---|---|
| 1167374 | 4/1964 | Fed. Rep. of Germany | |
| 1221664 | 7/1966 | Fed. Rep. of Germany | |
| 2033033 | 7/1970 | Fed. Rep. of Germany | 188/218 XL |
| 2235627 | 1/1974 | Fed. Rep. of Germany | |
| 1027686 | 4/1966 | United Kingdom | |
| 1149126 | 4/1969 | United Kingdom | |
| 1543497 | 4/1979 | United Kingdom | |
| 2162260 | 1/1986 | United Kingdom | 188/71.1 |

Primary Examiner—Andres Kashnikow
Assistant Examiner—Richard Potosnak
Attorney, Agent, or Firm—Foley & Lardner, Schwartz, Jeffery, Schwaab, Mack, Blumenthal & Evans

[57] ABSTRACT

The brake disk device has a cast brake disk with brake plates and a brake disk carrier connected to the brake disk. The carrier has integral connecting parts which are cast into the brake disk in composite casting. The brake disk carrier can consequently be securely connected to the brake disk during casting. Before the casting of the brake disk, it is fitted together with a mold core, the connecting parts of the brake disk carrier protruding into the mold core. The brake disk device can consequently be produced very simply and inexpensively.

7 Claims, 3 Drawing Sheets

BRAKE DISC DEVICE

BACKGROUND OF THE INVENTION

The invention relates to a brake disk device and a process for the production of such a brake disk device.

Brake disk devices of the general type disclosed consist of a brake disk with brake plates and a brake disk carrier which is connected to it and is bolted to the wheel of the motor vehicle. The brake plates form friction surfaces against which the brake linings are pressed during braking of the motor vehicle.

To achieve an adequate braking power for heavy and fast motor vehicles, in particular passenger cars, the friction surfaces and the brake lining of the brake plates have to be enlarged. In a normal case, this would result in an enlargement of the brake disk and thus in a change of the wheel from, for example, 15 to 16 inches. To avoid this, the caliper of the brake disk is arranged on the inside diameter of the brake disk (inwardly gripped brake disk). The friction surface of the brake disk can consequently be enlarged without enlarging the wheel or the wheel rim. However, this brake disk arrangement has the disadvantage that the disk chamber usually used has to be replaced by a brake disk carrier. This entails a higher production outlay and there is the problem of being able to connect the brake disk carrier securely and in a cost-effective way. It has already been proposed to cast bars into the brake disk to which the steel brake disk carrier is subsequently welded. The welds have to be specially corrosion-treated, such as descaled and pickled, and checked in an elaborate way for hairline cracks caused by thermal stresses. The weld root at the transition from the bars to the brake disk carrier must also have a satisfactory finish. This requires accurate, laborious welding and precise verification. Finally, if the brake disk is provided with cooling channels, the parts of the brake disk carrier welded onto the bars covers part of the cooling channels.

SUMMARY OF THE INVENTION

The invention is based on the object of designing a brake device of this type in such a way that a very secure hold between the brake disk and the brake disk carrier is ensured in a constructively simple and cost-effective way whereby the brake disk device can be economically produced. This object is achieved in the case of the generic type of brake disk device according to the invention.

Owing to the integral design of the connecting parts with the brake disk carrier, there is no need to produce separate connecting parts or the separate connection to the brake disk carrier. On account of the elimination of the separate fastening of the connecting parts, a considerable process outlay can be avoided and, above all, an extremely secure and durable connection is achieved between the brake disk carrier and the brake disk. A further advantage is that when the brake disk sets during production, the cast-in brake disk carrier follows the shrinking movements of the brake disk. If the brake disk heats up during operation, the brake disk carrier follows the relaxation movement, while the stresses occurring in cooling down are at least partially compensated. As a result, no distortion effects occur on the brake disk device according to the invention.

The process according to the invention has the advantage that it can be implemented very simply and cost-effectively since the connecting parts do not have to be placed separately in the mold. Rather, all that is necessary is to fit the brake disk carrier together with the core to bring the connecting parts into the required position with respect to the mold.

Further features of the invention will be apparent from the description which follows.

BRIEF DESCRIPTION OF THE APPLICATION DRAWINGS

The invention will be explained in more detail below with reference to an exemplary embodiment illustrated in the drawings, in which.

DETAILED DESCRIPTION OF THE PREFERRED EMBODIMENTS

Figure 1:
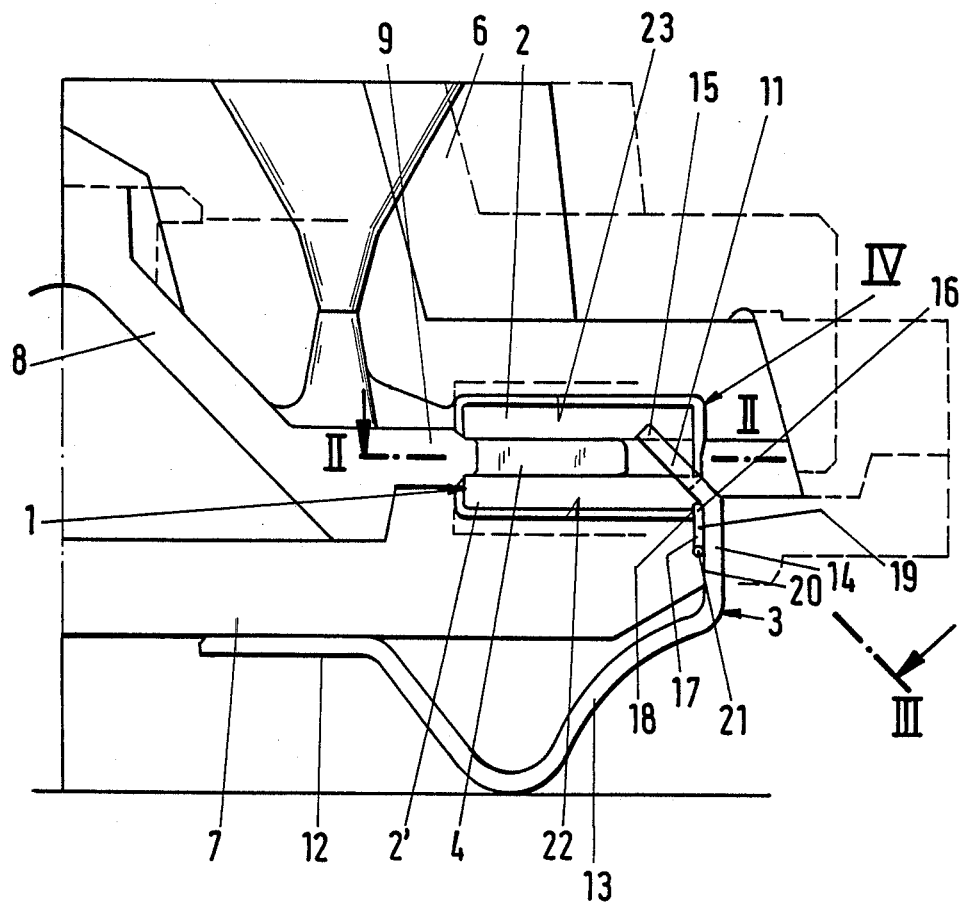
FIG. 1 is an elevational view showing a part of a brake disk and a brake disk carrier of a brake disk device according to the invention, in a casting mold for production of the brake disk and connection thereof to the brake disk carrier.

The brake disk device according to FIGS. 1 to 4 consists of a brake disk 1 and a brake disk carrier 3 firmly connected to it. The brake disk 1 is seated secure against torsion on an axle or shaft of a vehicle wheel (not shown) and is inwardly gripped by brake shoes (likewise not shown).

The brake disk 1 consists in a known way of two identical brake plates 2 and 2' which lie one above the other spaced axially apart and connected to each other by means of radially running rib-like webs 4, 4'. They have the same circumferential distance from each other and bound radially running cooling channels 5 also defined by the brake plates 2 and 2'. The integrally designed brake disk 1 is made of cast iron and is produced by the casting mold 6 to 8 shown in FIG. 1. It consists in a known way of a mold upper part 6, a basic core 7 and a cooling channel core 8. It has a number of radial ribs 9 (FIG. 1), corresponding to the number of cooling channels 5 envisaged, which are evenly distributed in the circumferential direction.

Figure 2:
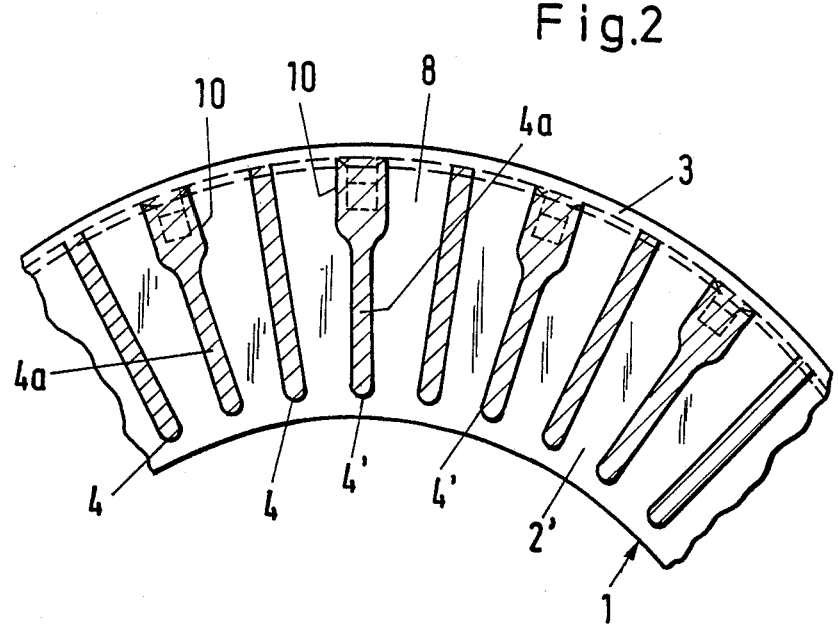
FIG. 2 is an enlarged sectional view taken along the line II—II in FIG. 1.

As FIG. 2 shows, the radially outer ends 10 of alternate webs 4' are widened. The web ends 10 are preferably approximately twice as wide as the remaining web sections 4a. Cast into the ends 10 are web-like connecting parts 11 of the brake disk carrier 3, which protrude into the gaps between neighboring ribs 9 of the cooling channel core during casting of the brake disk 1.

Figure 4:
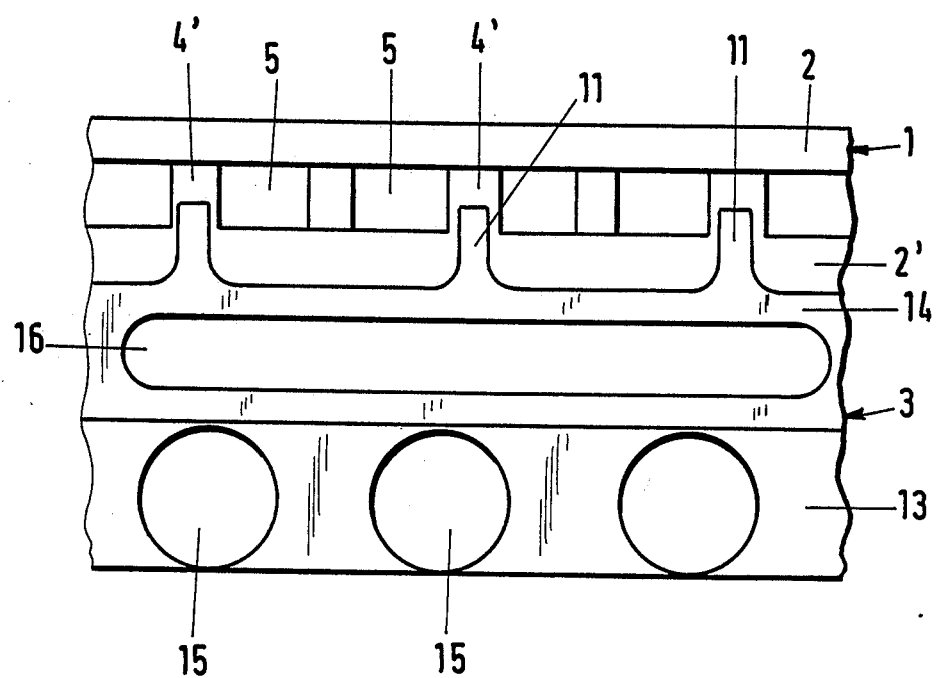
FIG. 4 is a side elevational view showing a part of the brake disk, taken in the direction of arrow IV in FIG. 1.

The brake disk carrier 3 is of cupped design and is preferably made of sheet steel. It has an annular disk-shaped fastening part 12 (FIG. 1), by which it is bolted to the vehicle wheel. Adjoining the fastening section 12 is an intermediate section 13 which is approximately v-shaped in cross section or profile and merges with an outer cylindrical section 14 (FIGS. 1, 4). It surrounds the brake plate 2' over part of its height and has the connecting parts or webs 11. The intermediate and cylindrical sections 13, 14 have circular or elongate brake-outs 15 and 16 successively arranged spaced equally apart in the circumferential direction, the elongate brake-throughs 16 extending in the circumferential direction.

The connecting parts 11 are designed as narrow, claw-like webs which run radially and obliquely from the edge of the cylindrical sections 14 facing the brake disk 1. The connecting parts 11 are cast into the brake disk 1 over the greater part of their length. To lend the connecting parts 11 a secure hold, the connecting parts lie on a level with the widened web ends 10, through which they protrude into the brake plate 2 by their ends 15 (FIG. 1). The brake disk 1 can consequently be firmly connected to the brake disk carrier 3. The connecting parts 11 have the same circumferential spacing from one another corresponding to the spacing of alternate webs 4' of the brake disk 1. As a result, a connecting part 11 is only embedded into every other web 4'. The connecting parts are narrower than the ends 10 of the webs 4' (FIG. 2), but slightly wider than their web sections 4a. This gives a large-area connection between the connection parts and the webs 4', without the flow cross section of the cooling channels 5 being reduced appreciably by the widened web ends 10. The cooling channels are therefore virtually completely available for cooling of the brake disk.

The connecting parts 11 can, of course, also be provided in a different distribution around the circumference of the brake disk carrier 3.

In order to avoid the cylindrical section 14 becoming welded to the brake plate 2' during casting and simultaneous connection of the brake disk 1 to the brake disk carrier 3, an annular insulating mat 17 is inserted between the radially outer edge 18 of the brake plate 2' and the opposite inner wall 19 of the cylindrical section 14 of the brake disk carrier 3. The insulating mat 17 preferably consists of mineral wool and has a thickness of approximately 2 mm. The insulating mat 17 protrudes from its point of restraint 16 to approximately half the height of the cylindrical section 14, and remains with the brake disk arrangement after casing as shown in FIG. 1.

The brake disk arrangement described is cast in the casting mold 6 to 8. The basic core 7 of the mold is arranged in the brake disk carrier 3 in such a way that it rests on the fastening section 12 of the brake disk carrier 3 and contacts by its outside 20 the inner wall 19 of the cylindrical section 14. The outside 20 has, in its upper half, a recess 21, into which the insulating mat 17 is inserted. The connecting parts 11 of the brake disk carrier 3 protrude into the casting mold, into the intermediate spaces between the neighboring ribs 9 of the cooling channel core 8, the intermediate spaces being bounded downwardly and upwardly by the insides 22 and 23 of the basic core 7 and of the mold upper section 6. The connecting parts 11 protrude over more than half their length, preferably over approximately three-quarters of their length (FIG. 1) into the intermediate spaces. When the brake disk 1 is cast in the mold 6 to 8, the connection parts 11 are satisfactorily surrounded by the casting material of the brake disk, and the brake disk carrier is consequently securely connected to the brake disk 1. Separate subsequent process steps, such as welding or the like, for connecting the brake disk carrier 3 to the brake disk 1 are no longer necessary.

A further advantage is that the connecting parts take up little space during casting of the brake disk and are therefore not disruptive.

Figure 3:
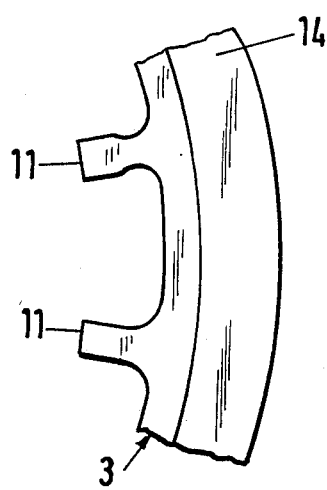
FIG. 3 is a sectional view taken in the direction of the arrow III in FIG. 1.

The connecting parts 11 may be of any shape which ensures a firm anchorage in the casting material of the brake disk 1. FIG. 3 shows two different examples of the shaping of the connecting parts 11. They may be widened at their ends or have a constant width over their length. The connecting parts 11 may also have brake-throughs, so that the casting material of the brake disk 1 penetrates through the connecting parts, and thus a firm connection between the brake disk carrier and the brake disk 1 is ensured. The connecting parts do not have to reach into the brake plate 2, but may also end in the web ends 10. The webs 4' do not have to have thickened ends 10, but may also have the same thickness over their entire length. The connecting parts 11 may also project perpendicularly from the cylindrical section 14.

The brake disk 1 does not have to have cooling channels 5, but may also be designed solidly if the application so requires.

What is claimed is:

1. A cast brake disc device for an inwardly gripped disk brake for a motor vehicle, comprising:
   (a) first and second axially spaced generally circular brake plates having a longitudinal axis and contact surfaces for brake pads,
   (b) webs positioned between said brake plates and interconnected thereto, said webs being circumferentially spaced to define spaced cooling channels between said plates, certain of said webs being provided with widened end sections at their radially outer ends to receive a carrier for said brake disc,
   (c) a brake disc carrier including a cylindrical section spaced radially outwardly of and partially surrounding said brake disc from the outside, said cylindrical section of said carrier being formed at an end thereof adjacent said disc brake with circumferentially spaced connecting parts, said connecting parts protruding obliquely to said axis from a point radially outside of said brake plates into the radially outer ends of said widened end section of said certain of said webs so that said connecting parts dare anchored therein during casting, and
   (d) an insulating member positioned between the radially outer edge of said first brake plate and an opposed wall of said cylindrical section of said carrier formed with said connecting parts.

2. A device according to claim 1, characterized in that said connecting parts extend into said second brake plate.

3. A device according to claim 1, characterized in that said connecting parts are spaced equally apart.

4. A device according to claim 1, characterized in that said connecting parts are connected to alternate webs.

5. A process for the production of a brake disc device comprised of an integrally cast brake disc and a brake disc carrier, comprising the steps of:
   (a) providing a mold core including a mold upper part and a basic core defining a mold cavity within which said brake disc is cast,
   (b) fitting a brake disc carrier in the mold core before casting the brake disc, said disc carrier including a cylindrical section having an inner wall and being positioned radially outwardly of the basic core and formed with connecting parts which protrude obliquely into the mold core,
   (c) inserting an insulating mat between an outer edge of the basic core and the inner wall of said cylinder section of the brake disc carrier, and
   (d) casting the brake disk and disk carrier so that only said connecting parts of said disc carrier securely hold parts of said brake disc and said mat, thereby eliminating the need for additional connecting members following the casting operation.

6. A process according to claim 5, characterized in that said insulating mat consists of mineral wool and has a thickness of approximately 2 mm.

7. A process according to claim 5, characterized in that the height of said insulating mat is approximately half the height of the cylindrical section.

* * * * *